US008441785B2

(12) United States Patent
Takakusaki

(10) Patent No.: US 8,441,785 B2
(45) Date of Patent: May 14, 2013

(54) ELECTRONIC APPARATUS AND PERSONAL COMPUTER

(75) Inventor: Masahiko Takakusaki, Tokyo (JP)

(73) Assignee: Kabushiki Kaisha Toshiba (JP)

( * ) Notice: Subject to any disclaimer, the term of this patent is extended or adjusted under 35 U.S.C. 154(b) by 1129 days.

(21) Appl. No.: 12/051,791

(22) Filed: Mar. 19, 2008

(65) Prior Publication Data

US 2008/0273438 A1 Nov. 6, 2008

(30) Foreign Application Priority Data

Mar. 19, 2007 (JP) .................................. 2007-071240

(51) Int. Cl.
*H05K 5/00* (2006.01)
*H05K 7/00* (2006.01)

(52) U.S. Cl.
USPC ............. 361/679.33; 361/679.37; 361/679.38

(58) Field of Classification Search ............. 361/679.33, 361/679.37, 679.38
See application file for complete search history.

(56) References Cited

U.S. PATENT DOCUMENTS

| 5,506,749 | A | * | 4/1996 | Matsuda .................. 361/679.58 |
| 5,768,098 | A | * | 6/1998 | Murayama ............... 361/679.09 |
| 5,905,632 | A | * | 5/1999 | Seto et al. ................ 361/679.55 |
| 5,943,208 | A | | 8/1999 | Kato et al. |
| 6,016,249 | A | | 1/2000 | Ogawa et al. |
| 6,381,129 | B1 | | 4/2002 | Shimada et al. |
| 6,751,092 | B1 | | 6/2004 | Ohnishi et al. |
| 2008/0043419 | A1 | * | 2/2008 | Tatsukami .................... 361/683 |

FOREIGN PATENT DOCUMENTS

| JP | 07-219676 A | 8/1995 |
| JP | 08-255471 A | 10/1996 |
| JP | H08-255471 | 10/1996 |
| JP | 10-144066 A | 5/1998 |
| JP | H10-144066 | 5/1998 |
| JP | 11-242881 A | 9/1999 |
| JP | H11-242881 | 9/1999 |
| JP | 2001-075674 A | 3/2001 |

OTHER PUBLICATIONS

Notification of Reason for Refusal mailed by Japan Patent Office on Apr. 12, 2011 in the corresponding Japanese patent application No. 2007-071240.

* cited by examiner

*Primary Examiner* — Anthony Haughton
(74) *Attorney, Agent, or Firm* — Knobbe, Martens, Olson & Bear LLP

(57) ABSTRACT

An electronic apparatus includes: a housing that is provided with an opening at a bottom face thereof; a printed circuit board accommodated in the housing; a first lid member that is detachably arranged so as to cover the opening; a disk drive that is mounted in a lower position than the printed circuit board inside the opening in a state where the first lid member is removed from the opening; and a second lid member that is detachably arranged so as to cover the opening in a state where the disk drive is mounted inside the opening, wherein the second lid member has a storage section, and the disk drive is stored in the storage section.

16 Claims, 8 Drawing Sheets

ELECTRONIC APPARATUS AND PERSONAL COMPUTER

CROSS-REFERENCE TO RELATED APPLICATIONS

This application is based upon and claims the benefit of priority from Japanese Patent Application No. 2007-071240, filed on Mar. 19, 2007, the entire content of which are incorporated herein by reference.

BACKGROUND

1. Field

One embodiment of the invention relates to an electronic apparatus and a personal computer installed with a disk drive.

2. Description of the Related Art

For example, the following apparatus is disclosed as the electronic apparatus installed with a disk drive. The electronic apparatus includes a housing, a disk storage section provided in the housing, a disk drive accommodated in the disk storage section, a lid member that covers the disk storage section, and an impact-absorbing material provided between the lid member and the disk drive. In this electronic apparatus, by providing the impact-absorbing material, the impact resistance of the electronic apparatus is enhanced, thereby preventing data from being damaged in the disk drive when a strong impact is applied to the electronic apparatus.

An example of thus configured electronic apparatus is disclosed in JP-A-11-242881 (counterpart U.S. patent is: U.S. Pat. No. 6,751,092 B1).

Generally, an electronic apparatus includes a circuit board on which a CPU and the like are mounted, and this circuit board is often arranged in a position apart from a disk storage section. This prevents the circuit board and the disk storage section from being overlapped on each other, thereby preventing the thickness of an electronic apparatus from increasing.

However, there is also an electronic apparatus in which, in addition to the existing disk drive, other disk drives should be arranged in a position between the circuit board and the housing in order to meet the user's requirement by, for example, a BTO (Build To Order). In this case, it is necessary to prepare an exclusive housing whose thickness becomes large, and it is necessary to use a forming die for manufacture of the housing. As a result, there is a problem in that manufacturing cost increases. There is also a problem in that the thick housing disfigures an electronic apparatus.

SUMMARY

One of objects of the present invention is to provide an electronic apparatus capable of minimizing design changes of a housing, for example, in order to implement a disk drive.

According to a first aspect of the present invention, there is provided an electronic apparatus including: a housing that is provided with an opening at a bottom face thereof; a printed circuit board accommodated in the housing; a first lid member that is detachably arranged so as to cover the opening; a disk drive that is mounted in a lower position than the printed circuit board inside the opening in a state where the first lid member is removed from the opening; and a second lid member that is detachably arranged so as to cover the opening in a state where the disk drive is mounted inside the opening, wherein the second lid member has a storage section, and the disk drive is stored in the storage section.

According to a second aspect of the present invention, there is provided a personal computer including: a display unit that is provided with a display device; a main unit that is provided with an opening at a bottom face thereof and an input device; a printed circuit board accommodated in the main unit; a first lid member that is detachably arranged so as to cover the opening; a disk drive that is mounted in a lower position than the printed circuit board inside the opening in a state where the first lid member is removed from the opening; and a second lid member that is detachably arranged so as to cover the opening in a state where the disk drive is mounted inside the opening, wherein the second lid member has a storage section, and the disk drive is stored in the storage section.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Figure 1:
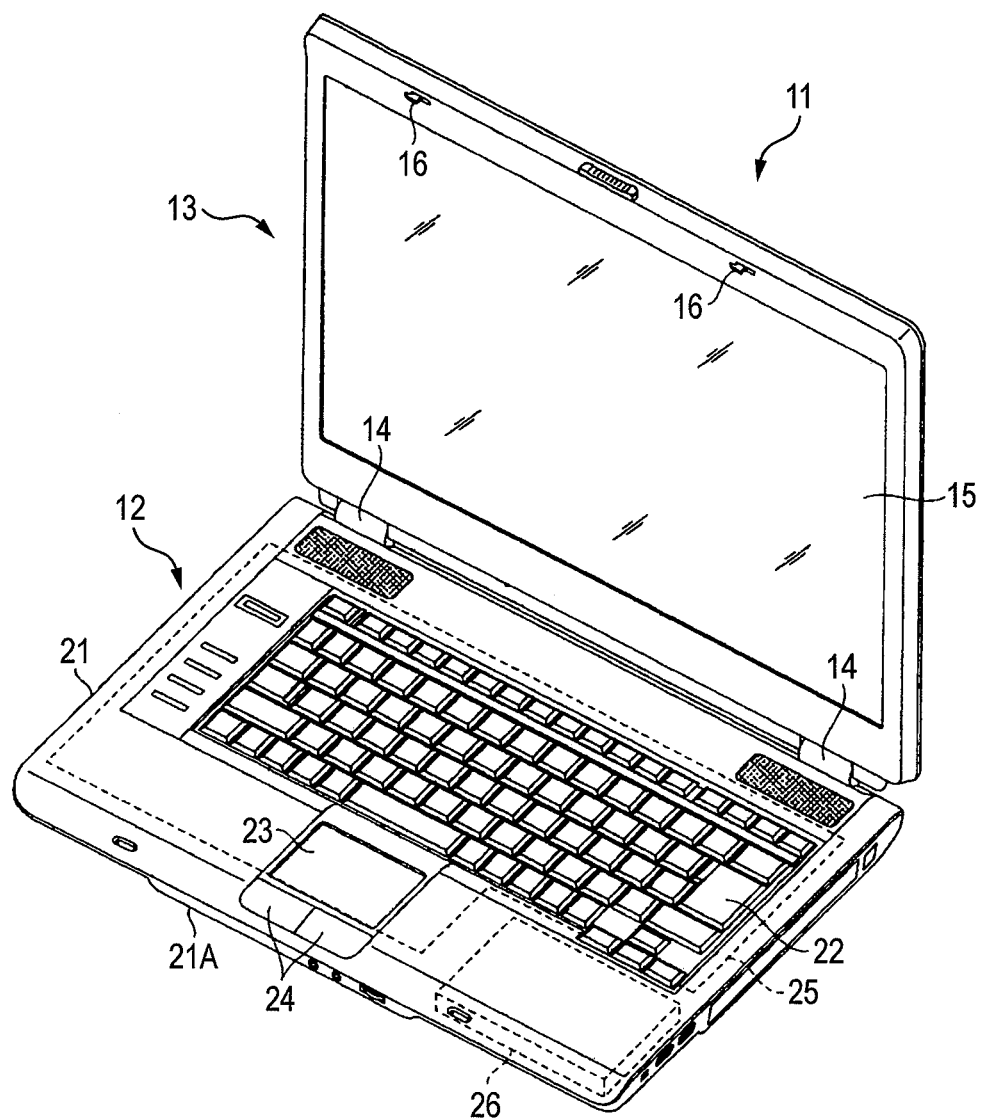
FIG. 1 is a perspective view showing a portable computer according to a first embodiment of the present invention.

Hereinafter, embodiments of an electronic apparatus will be described with reference to FIGS. 1 to 8. As shown in FIG. 1, a portable computer 11, which is an example of the electronic apparatus, includes a main unit 12, a display unit 13, and hinge portions 14 provided between the main unit 12 and the display unit 13. The hinge portions 14 support the display unit 13, and allow the display unit 13 to rotate with respect to the main unit 12. The display unit 13 has a display 15 and latches 16. In addition, a personal computer is a concept including a desktop computer and a notebook computer, and a portable computer 11 is an example of this personal computer.

The main unit 12 includes a housing 21 made of resin, a keyboard 22, and a touchpad 23 and buttons 24 that are pointing devices. The housing 21 of the main unit 12 has therein a printed circuit board 25 on which electronic components, such as a CPU (central processing unit), are mounted, a main disk drive 26, and a subsidiary disk drive 27 that is a disk drive. The main disk drive 26 is a disk drive installed in the portable computer 11 as standard. The subsidiary disk drive 27 is a disk drive that is suitably installed on the portable computer 11 in response to, for example, a BTO (Build To Order) from a customer, etc. The main disk drive 26 and the subsidiary disk drive 27 include, for example, hard disk drive units.

Figure 2:
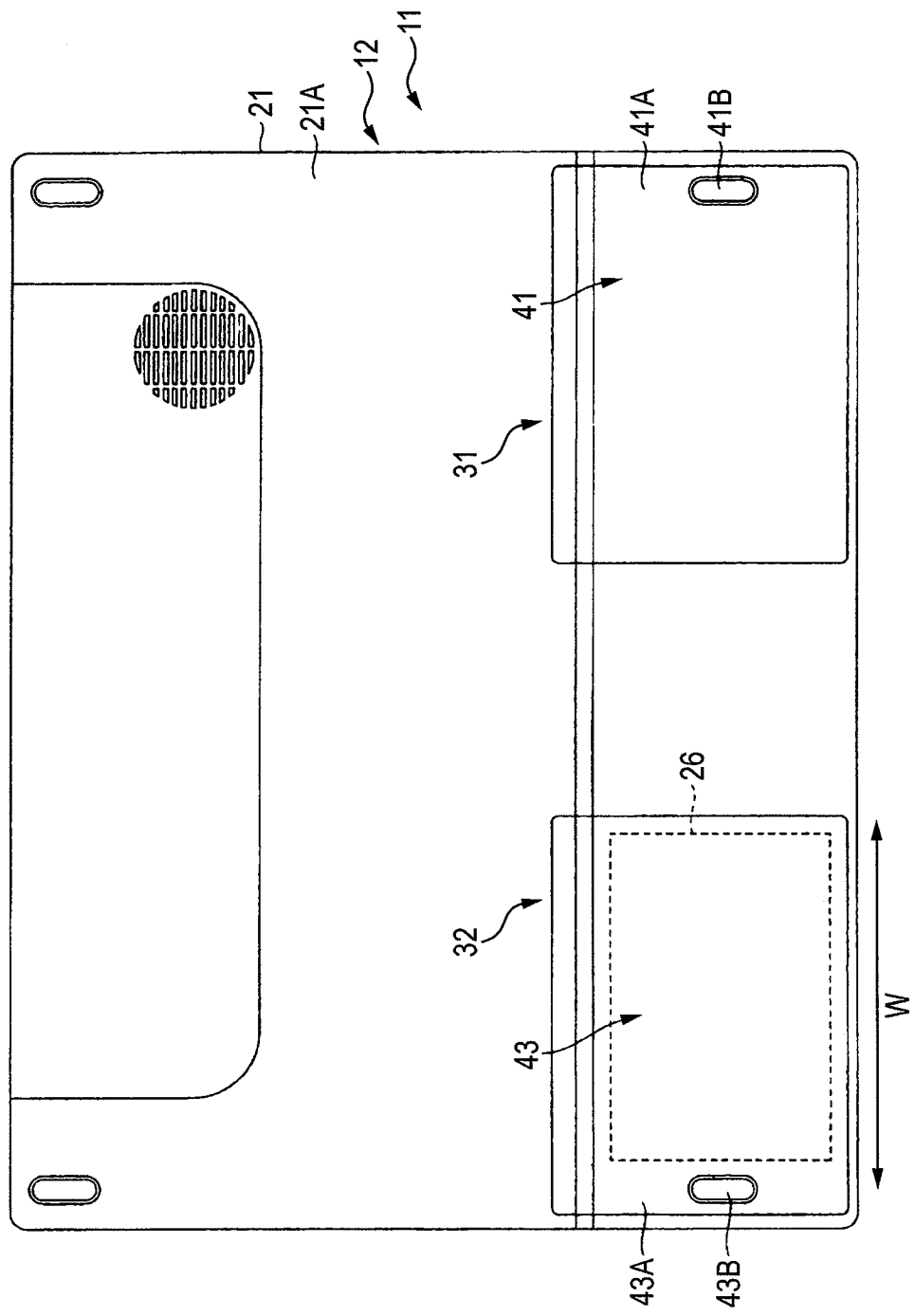
FIG. 2 is a bottom view showing the portable computer shown in FIG. 1.

The housing 21 has a bottom face 21A, a first opening 31 and a second opening 32, which are provided in portions of the bottom face 21A, a first lid member 41 for covering the first opening 31, a second lid member 42 for covering the first opening 31, and a third lid member 43 for covering the second opening 32. As shown in FIG. 2, the first opening 31 is provided in a position corresponding to a portion of the bottom face 21A of the housing 21, i.e., in a right portion of the bottom face 21A. The second opening 32 is provided in a position corresponding to a portion of the bottom face 21A of the housing 21, i.e., in a left portion of the bottom face 21A. As described above, the housing 21 has two kinds of lid members for covering the first opening 31. The third lid member 43 has a third lid body 43A and a third leg 43B formed so as to protrude from the third lid body 43A.

As shown in FIG. 2, the second opening 32 is formed in a rectangular shape, and is in continuity with a second accommodating portion (not shown) that is formed inside the housing 21. A second screw hole (not shown) for screwing the third lid member 43 is provided around the second opening 32. The main disk drive 26 is stored inside the second accommodating portion. The main disk drive 26 is electrically connected to the printed circuit board 25 by a second connector (not shown).

Figure 4:
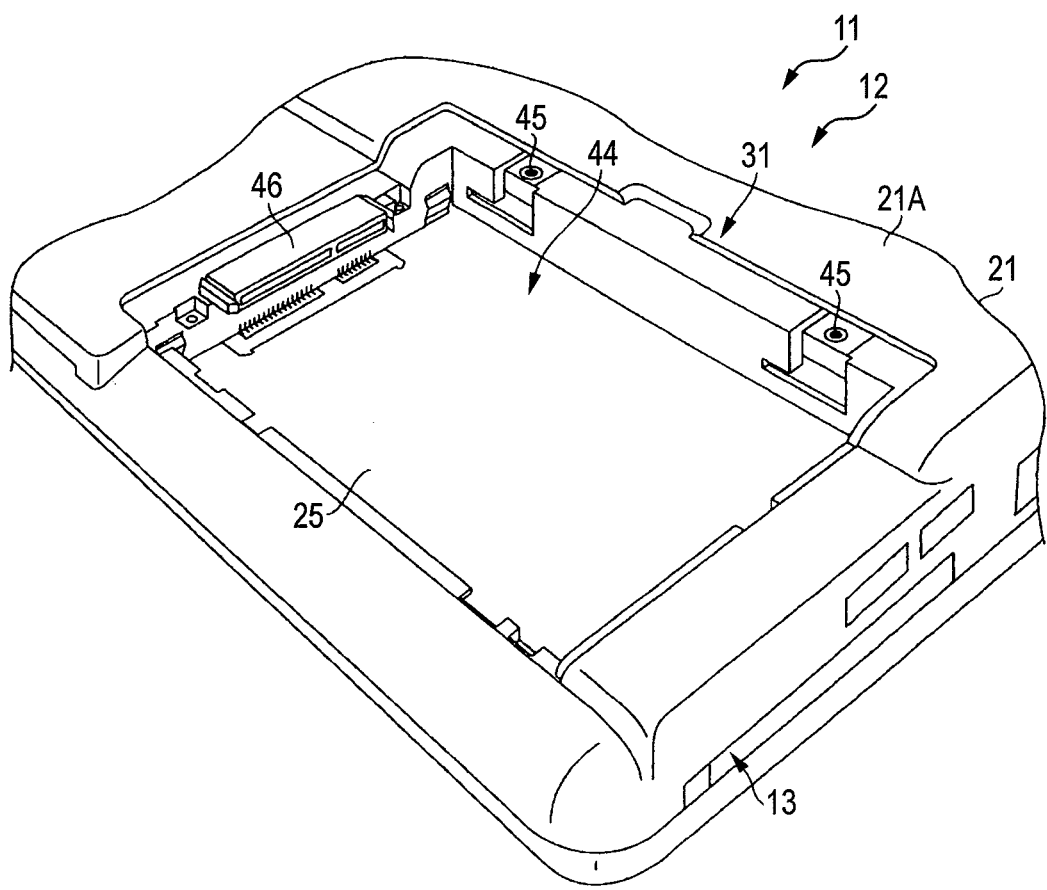
FIG. 4 is a perspective view showing a state where the first lid member is detached from the first opening shown in FIG. 3.
Figure 5:
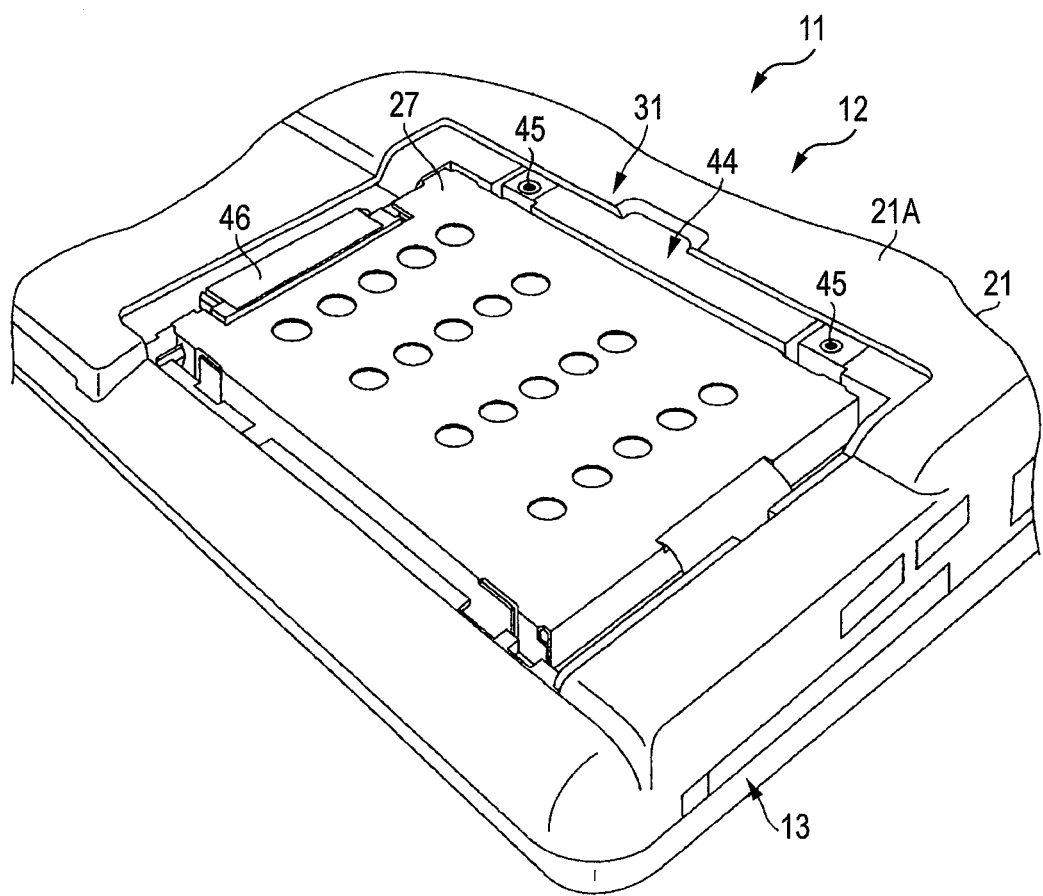
FIG. 5 is a perspective view showing a state where a subsidiary disk drive is mounted to the first opening shown in FIG. 4.

As shown in FIG. 4, the first opening 31 is formed in a rectangular shape, and is in continuity with the first accommodating portion 44 formed inside the housing 21. The bottom of the first accommodating portion 44 is defined by the printed circuit board 25. That is, the printed circuit board 25 is exposed to the outside via the first opening 31. First screw holes 45 for screwing the first lid member 41 and the second lid member 42 are provided around the first opening 31. Further, a first connector 46 for connection with the subsidiary disk drive 27 shown in FIG. 5 is provided inside the first accommodating portion 44. In addition, between the printed circuit board 25 and the subsidiary disk drive 27, an insulator for insulating these is provided. Illustration of the insulator is omitted.

As shown in FIG. 5, the subsidiary disk drive 27 is mounted to the first accommodating portion 44 in a state where the first lid member 41 is removed from the first opening 31. More specifically, the subsidiary disk drive 27 is mounted in a lower position than the printed circuit board 25 inside the first opening 31.

Figure 3:
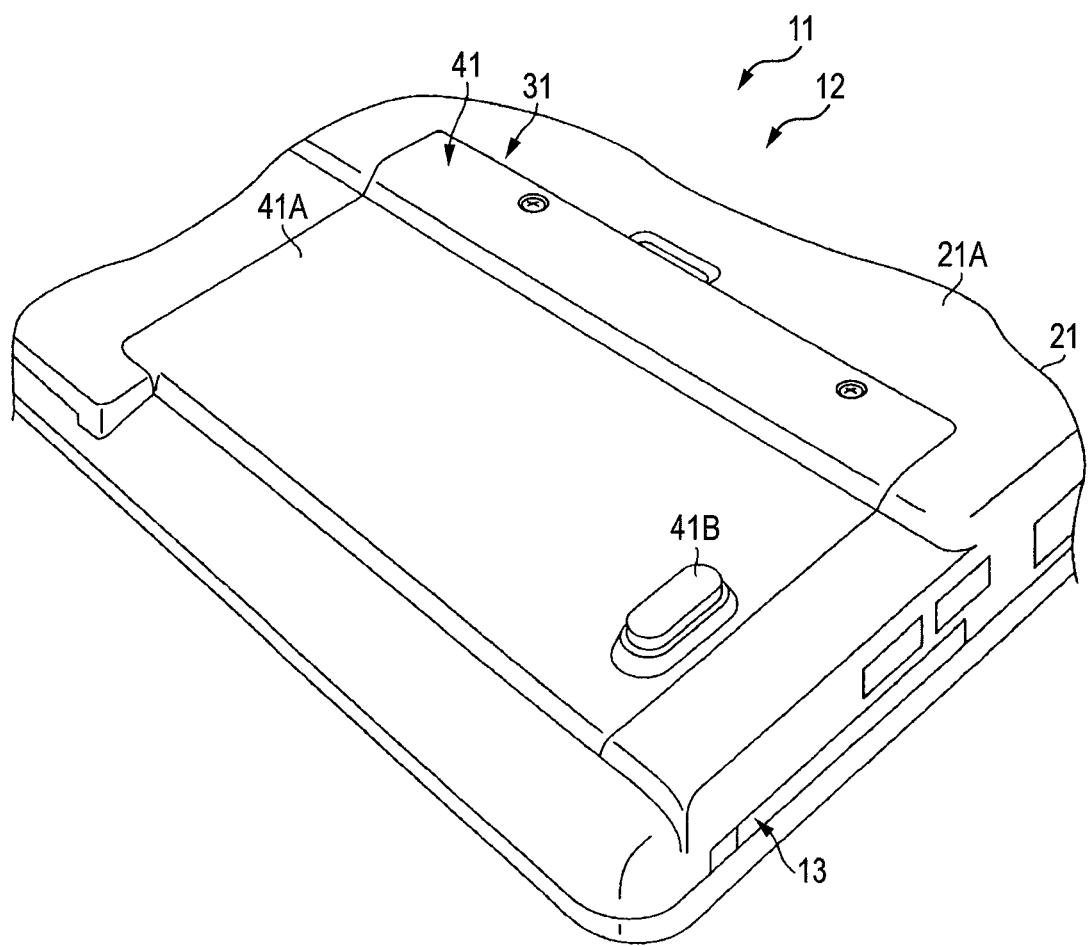
FIG. 3 is a perspective view showing a state where a first lid member is attached to a first opening of the portable computer shown in FIG. 2.

As shown in FIG. 3, the first lid member 41 has a rectangular, and substantially plate-like lid body 41A, and a first leg 41B that is formed so as to protrude from the first lid body 41A. The first leg 41B is formed in the shape of a frustum. The first lid member 41 is able to cover the first opening 31 as shown in FIG. 3, or is able to be removed from the first opening 31 from as shown in FIG. 4.

Figure 6:
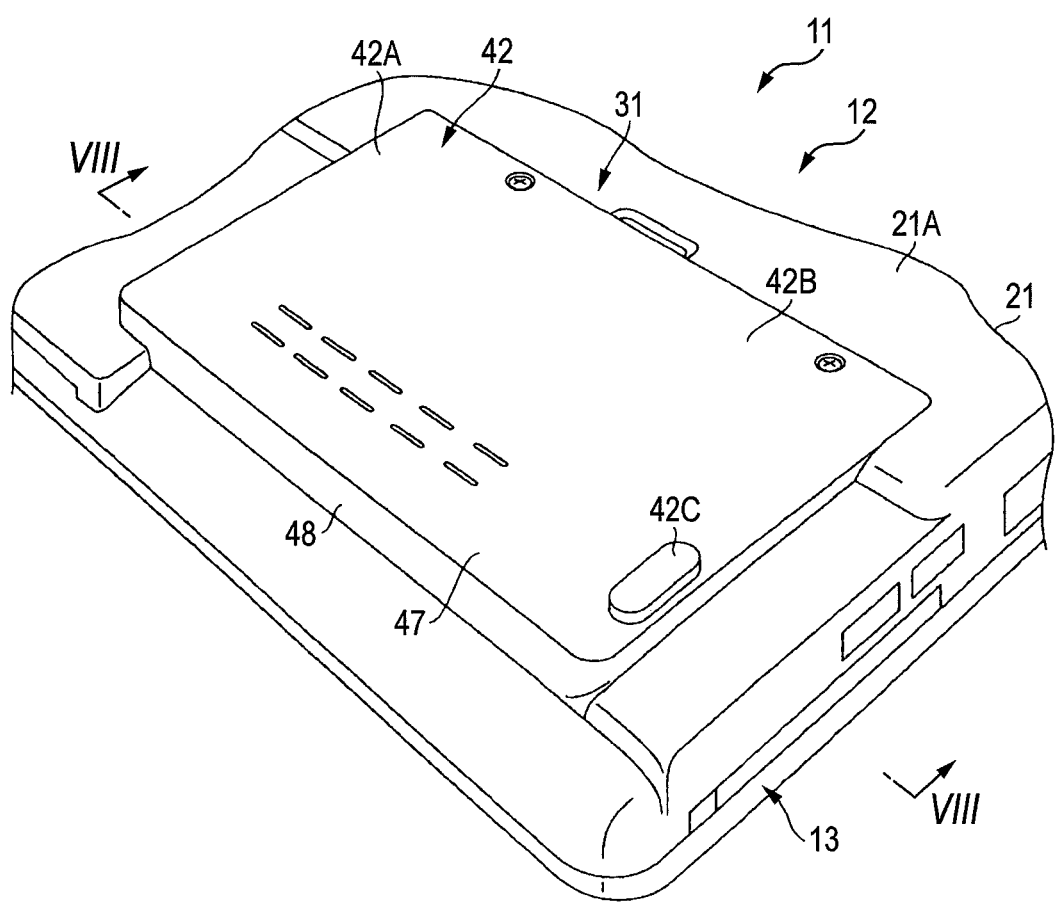
FIG. 6 is a perspective view showing a state where a second lid member is attached to the opening shown in FIG. 5.

As shown in FIG. 6, the second lid member 42 has a second lid body 42A, a storage section 42B provided in the second lid body 42A, and a second leg 42c formed so as to protrude from the storage section 42B. The storage section 42B has a bottom plate 47 and a frame-shaped frame 48 that is set up from the periphery of the bottom plate 47. Although the second leg 42C is formed in an elliptical shape, the height thereof is made smaller than the height of the first leg 41B. The subsidiary disk drive 27 can be stored inside the storage section 42B.

Figure 7:
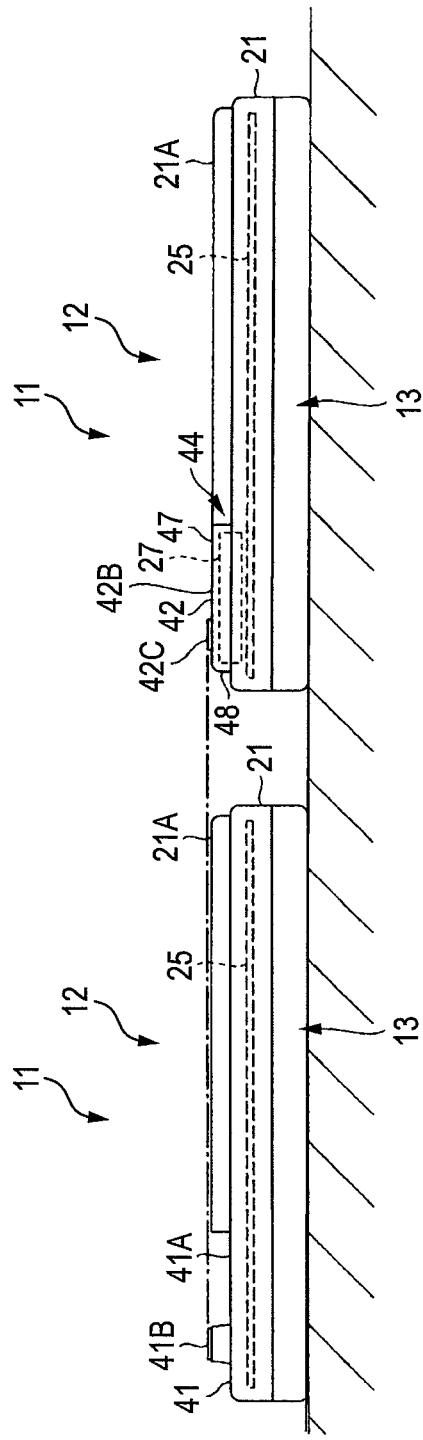
FIG. 7 is a side view showing comparison between a portable computer to which the first lid member shown in FIG. 3 is attached, and a portable computer to which the second lid member is attached.

As shown in FIG. 7, the storage section 42B of the second lid member 42 is arranged within a range of the height of the first leg 41B of the first lid member 41. The second lid member 42 is able to cover the first opening 31 as shown in FIG. 6, or is able to be removed from the first opening 31 from as shown in FIG. 4, in a state where the subsidiary disk drive 27 is mounted inside the first opening 31.

As shown in FIG. 7, the thickness of the housing 21 is designed so as to be the same in a state where the first lid member 41 is mounted to the first opening 31, and in a state where the second lid member 42 is mounted to the first opening 31. For this reason, a dimension that is obtained by adding up the height of the storage section 42B of the second lid member 42 and the height of the second leg 42C is made equal to a dimension that is obtained by adding up the height of the first lid body 41A of the first lid member 41 and the height of the first leg 41B.

Figure 8:
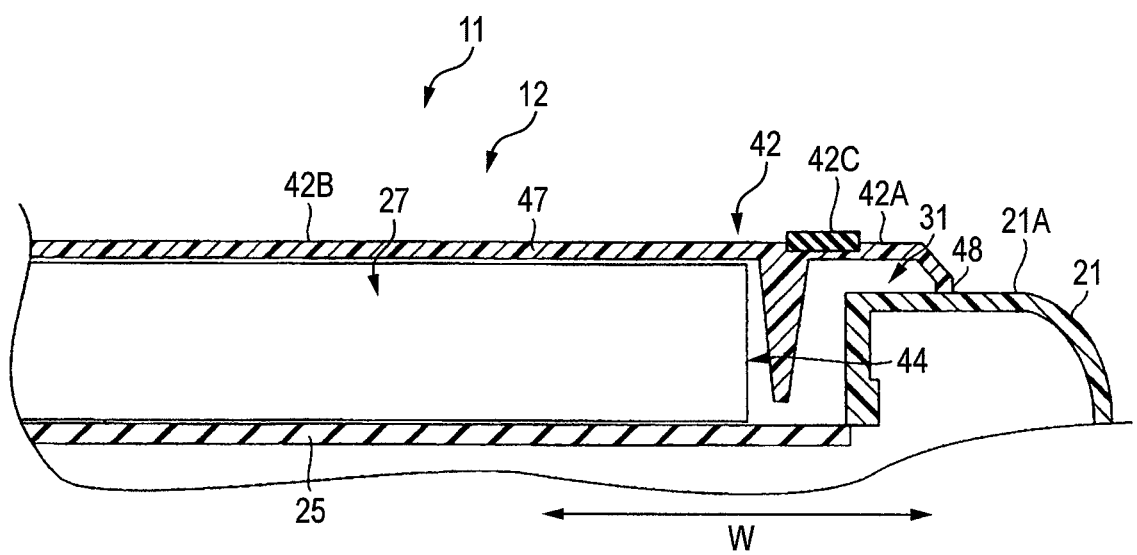
FIG. 8 is a cross-sectional view taken along the line VIII-VIII of the portable computer shown in FIG. 6.

Subsequently, with reference to FIGS. 2 and 8, the positional relationship between the main disk drive 26 and the third leg 43B of the third lid member 43 and the positional relationship between the subsidiary disk drive 27 and the second leg 42C of the second lid member 42 will be described.

As shown in FIG. 2, the third leg 43B of the third lid member 43 is arranged in a position out of the main disk drive 26, for example, in the width direction W of the portable computer 11. Further, as shown in FIG. 8, the second leg 42C of the second lid member 42 is arranged in a position out of the main disk drive 27, for example, in the width direction W of the portable computer 11. For this reason, the impact when the portable computer 11 is put on a desk, etc. is directly transmitted to the main disk drive 26 and the subsidiary disk drive 27. However, the third leg 43B and the third second leg 42C are not limited to those in positions out of the disk drives 26 and 27 in the width direction W of the portable computer 11. The third leg 43B and the third second leg 42C may be in positions out of the disk drives 26 and 27 in the depth direction orthogonal to the width direction W of the portable computer 11.

Subsequently, the operation of mounting the subsidiary disk drive 27 on the portable computer 11 will be described with reference to FIGS. 3 to 6. First, as shown in FIG. 3, in the standard state, the first opening 31 is not mounted with the subsidiary disk drive 27, but mounted with only the first lid member 41.

If the number of subsidiary disk drives 27 is increased according to a BTO from a customer, the subsidiary disk drives 27 are mounted to the first opening 31 (shown in FIG. 4) to which anything are not mounted. As shown in FIG. 5, the subsidiary disk drive 27 is mounted in a lower position than the printed circuit board 25 inside the first opening 31. In addition, since the portable computer is put upside down in FIG. 5, the subsidiary disk drive 27 is mounted in an upper position than the printed circuit board 25 in this drawing.

At this time, the subsidiary disk drive 27 is attached to the first connector 46, and is electrically connected to the printed circuit board 25. Moreover, as shown in FIG. 6, mounting of the subsidiary disk drive 27 is completed by mounting the second lid member 42 to the first opening 31 to cover the subsidiary disk drive 27 with the second lid member 42.

According to the embodiment described above, a portable computer 11 includes a housing 21, a printed circuit board 25 accommodated in the housing 21, a first lid member 41 that covers the first opening 31 provided in a portion of a bottom face of the housing 21, or is removed from the first opening 31, a subsidiary disk drive 27 that is mounted in a lower position than the printed circuit board 25 inside the first opening 31 in a state where the first lid member 41 is removed from the first opening 31, and a second lid member 42 that covers the first opening 31 or is removed from the first opening 31, in a state where the subsidiary disk drive 27 is mounted inside the first opening 31. The second lid member 42 has a storage section 42B and the subsidiary disk drive 27 is stored in the storage section 42B.

According to this configuration, even in a case where the number of subsidiary disk drives 27 should be increased in response to, for example, a BTO, etc., it is possible to simply respond to the BTO by replacing the first lid member 41 with the second lid member 42. For this reason, it is sufficient if the forming die for forming the second lid member 42 is prepared separately, and it is not necessary to newly prepare a forming die for forming the whole housing 21. For this reason, design changes of the housing 21 can be minimized. This can reduce the cost involved in the manufacture of the housing 21.

In this case, the first lid member 41 has the first lid body 41A and the first leg 41B formed so as to protrude from the first lid body 41A, and the storage section 42B of the second lid member 42 is arranged within a range of the height of the first leg 41B of the first lid member 41. According to this configuration, even if in a case where a subsidiary disk drive 27 is newly carried by mounting the second lid member 42, it is possible to prevent the thickness of a housing 21 from increasing.

In this case, the second lid member 42 has the second leg 42C, and the second leg 42C is formed so as to protrude from the storage section 42B. The dimension that is obtained by adding up the height of the storage section 42B of the second lid member 42 and the height of the second leg 42C is made equal to the dimension that is obtained by adding up the height of the first lid body 41A of the first lid member 41 and the height of the first leg 41B. According to this configuration, the thickness of the portable computer 11 is designed so as to be the same in a state where the first lid member 41 is mounted to the first opening 31, and in a state where the second lid member 42 is mounted to the first opening 31. This makes it possible to make the installation height of the keyboard 22 of the portable computer 11 the same irrespective of the existence/nonexistence of loading of the subsidiary disk drive 27. Consequently, when a user uses the keyboard 22, the same type of sense can be maintained.

In this case, the second leg 42C is arranged in a position out of the subsidiary disk drive 27. If the portable computer 11 is put on a desk etc. with great force, it is general that an impact is transmitted to the housing 21 via each of the legs 41B, 42C, and 43B. According to this configuration, since the second leg 42C is in a position out of the subsidiary disk drive 27, it is possible to prevent the above impact from being directly transmitted to the subsidiary disk drive 27. This makes it possible to protect the data stored in the subsidiary disk drive 27.

Similarly, the third leg 43B is arranged in a position out of the main disk drive 26. This makes it possible to prevent an impact from being directly transmitted to the main disk drive 26. For this reason, the data saved in the main disk drive 26 can be protected.

The electronic apparatus of the invention is not limited to the portable computer 11, and can be implemented even in other electronic apparatuses, such as the personal digital assistants. In addition, the electronic apparatus can be modified variously and implemented without departing from the scope of the claimed invention.

What is claimed is:

1. An electronic apparatus comprising:
a housing that is provided with an opening at a bottom face thereof;
a printed circuit board accommodated in the housing;
a first lid member that is detachably arranged so as to cover the opening and be flush with the bottom face of the housing;
a disk drive that is configured to be mounted in a lower position than the printed circuit board inside the opening in a state where the first lid member is removed from the opening; and
a second lid member that is detachably arranged so as to cover the opening in place of the first lid member in a state where the disk drive is mounted inside the opening and so that a portion of the second lid member is flush with the bottom face of the housing,
wherein the second lid member comprises a storage section, and at least a portion of the disk drive is stored in the storage section.

2. The apparatus of claim 1, wherein the first lid member comprises a lid body and a first leg formed to protrude from the lid body, and
wherein the storage section of the second lid member is arranged within the height of the first leg of the first lid member.

3. The apparatus of claim 2, wherein the second lid member comprises a second leg formed to protrude from the storage section, and
wherein a first height obtained by adding a height of the first lid body and the first leg is configured to be equal to a second height obtained by adding a height of the storage section and the second leg.

4. The apparatus of claim 3, wherein the second leg is arranged at a position where the disk drive is not mounted.

5. A personal computer comprising:
a display unit that is provided with a display device;
a main unit that is provided with an opening at a bottom face thereof and an input device;
a printed circuit board accommodated in the main unit;
a first lid member that is detachably arranged so as to cover the opening and be flush with the bottom face of the housing;
a disk drive that is configured to be mounted in a lower position than the printed circuit board inside the opening in a state where the first lid member is removed from the opening; and
a second lid member that is detachably arranged so as to cover the opening in place of the first lid member in a state where the disk drive is mounted inside the opening and so that a portion of the second lid member is flush with the bottom face of the housing,
wherein the second lid member comprises a storage section, and at least a portion of the disk drive is stored in the storage section.

6. The personal computer of claim 5, wherein the first lid member comprises a lid body and a first leg formed to protrude from the lid body, and
wherein the storage section of the second lid member is arranged within the height of the first leg of the first lid member.

7. The personal computer of claim 6, wherein the second lid member comprises a second leg formed to protrude from the storage section, and
wherein a first height obtained by adding a height of the first lid body and the first leg is configured to be equal to a second height obtained by adding a height of the storage section and the second leg.

8. The personal computer of claim 7, wherein the second leg is arranged at a position where the disk drive is not mounted.

9. An electronic apparatus comprising:
a housing that is provided with an opening at a bottom face thereof;
a printed circuit board accommodated in the housing;
a first lid member that is detachably arranged so as to cover the opening;
a disk drive that is configured to be mounted in a lower position than the printed circuit board inside the opening in a state where the first lid member is removed from the opening;
a disk cage configured to cover the disk drive; and
a second lid member that is detachably arranged so as to cover the opening in place of the first lid member in a state where the disk drive is mounted inside the opening,
wherein the second lid member comprises a storage section, and at least a portion of the disk drive is stored in the storage section.

10. The apparatus of claim 9, wherein the first lid member comprises a lid body and a first leg formed to protrude from the lid body, and
wherein the storage section of the second lid member is arranged within the height of the first leg of the first lid member.

11. The apparatus of claim 10, wherein the second lid member comprises a second leg formed to protrude from the storage section, and
wherein a first height obtained by adding a height of the first lid body and the first leg is configured to be equal to a second height obtained by adding a height of the storage section and the second leg.

12. The apparatus of claim 11, wherein the second leg is arranged at a position where the disk drive is not mounted.

13. A personal computer comprising:
a display unit that is provided with a display device;
a main unit that is provided with an opening at a bottom face thereof and an input device;
a printed circuit board accommodated in the main unit;
a first lid member that is detachably arranged so as to cover the opening;
a disk drive that is configured to be mounted in a lower position than the printed circuit board inside the opening in a state where the first lid member is removed from the opening;
a disk cage configured to cover the disk drive; and
a second lid member that is detachably arranged so as to cover the opening in place of the first lid member in a state where the disk drive is mounted inside the opening,
wherein the second lid member comprises a storage section, and at least a portion of the disk drive is stored in the storage section.

14. The personal computer of claim 13, wherein the first lid member comprises a lid body and a first leg formed to protrude from the lid body, and
wherein the storage section of the second lid member is arranged within the height of the first leg of the first lid member.

15. The personal computer of claim 14, wherein the second lid member comprises a second leg formed to protrude from the storage section, and
wherein a first height obtained by adding a height of the first lid body and the first leg is configured to be equal to a second height obtained by adding a height of the storage section and the second leg.

16. The personal computer of claim 15, wherein the second leg is arranged at a position where the disk drive is not mounted.

* * * * *